No. 886,174. PATENTED APR. 28, 1908.
G. BINDER.
CARRIAGE FEED FOR SAWING MACHINES.
APPLICATION FILED MAR. 22, 1907.
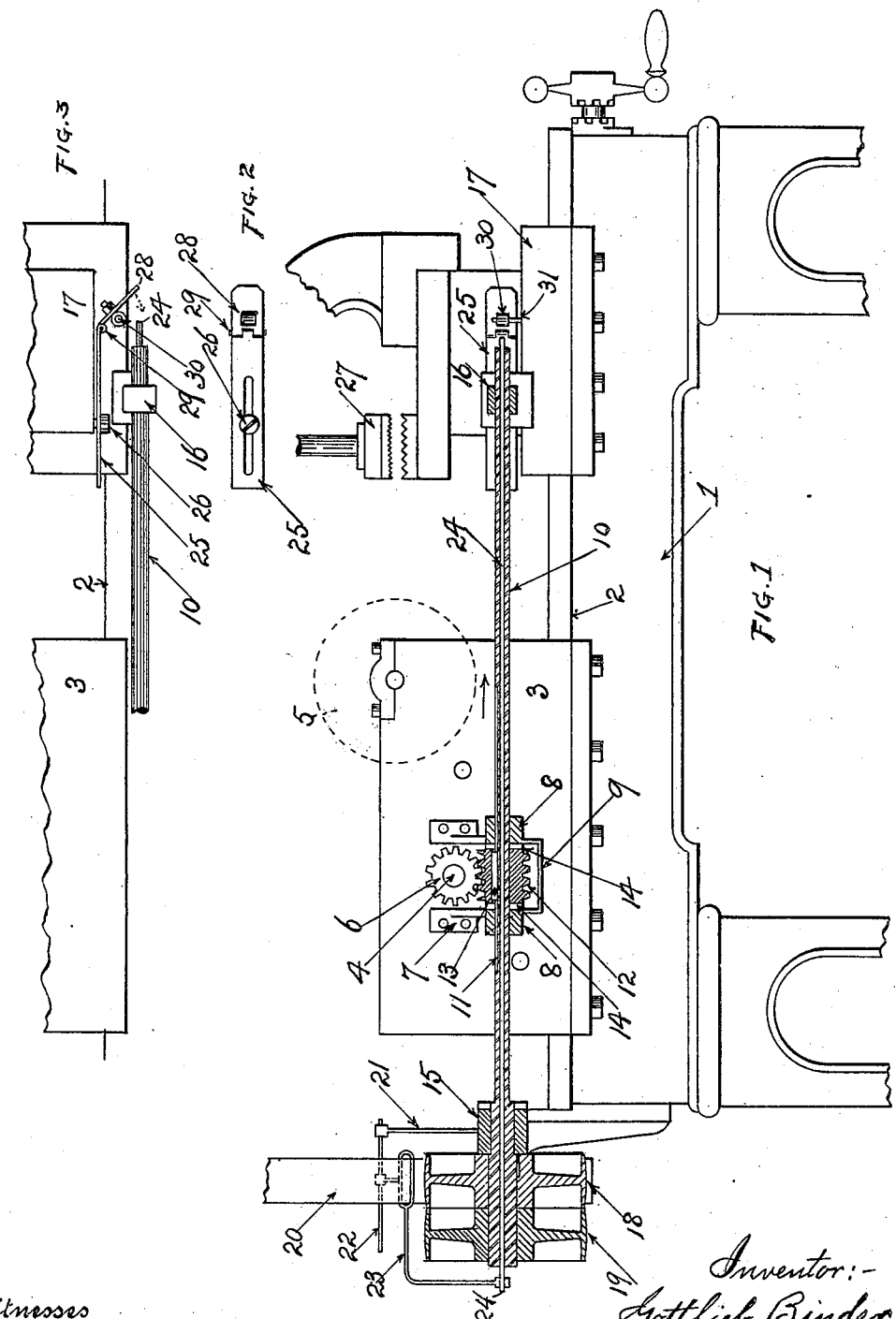
Witnesses
Wm. F. Burghard
B. F. Kubaugh.
Inventor:-
Gottlieb Binder
By E. B. Stocking
Attorney

UNITED STATES PATENT OFFICE.

GOTTLIEB BINDER, OF LOUISVILLE, KENTUCKY, ASSIGNOR, BY DIRECT AND MESNE ASSIGNMENTS, TO KENTUCKY GEAR AND MACHINE COMPANY, OF LOUISVILLE, KENTUCKY, INCORPORATED.

CARRIAGE-FEED FOR SAWING-MACHINES.

No. 886,174.     Specification of Letters Patent.     Patented April 28, 1908.

Application filed March 22, 1907. Serial No. 363,949.

*To all whom it may concern:*

Be it known that I, GOTTLIEB BINDER, a citizen of the United States, residing at Louisville, in the county of Jefferson, State of Kentucky, have invented certain new and useful Improvements in Carriage-Feeds for Sawing-Machines, of which the following is a specification, reference being had therein to the accompanying drawing.

This invention relates to a carriage feed for sawing machines, and particularly to a driving device adapted to feed a tool mounted upon the carriage during the movement thereof.

The invention has for an object to provide a longitudinally disposed drive shaft extending parallel to the path of travel of the carriage and having a slidingly mounted driving gear thereon in constant mesh with the driving shaft of the feed carriage.

A further object of the invention is to provide a shifting rod carried by the drive shaft and adapted to be actuated by a shifting lever with which the traveling carriage contacts in order to carry the driving belt from a fast to a loose pulley.

Other and further objects and advantages of the invention will be hereinafter set forth and the novel features thereof defined by the appended claims.

In the drawing:—Figure 1 is an elevation of the invention with parts in section; Fig. 2 is a side elevation of the reversing lever, and Fig. 3 is a partial plan of this part and the shifting rod carried by the drive shaft.

Like numerals refer to like parts in the several views of the drawing.

The numeral 1 designates the frame of the machine which may be of any desired character and is provided at its upper portion with tracks or ways 2 upon which the traveling carriage 3 is mounted. This carriage may be of any desired construction and carry any preferred tool, but in the present illustration is shown as comprising the traveling saw carriage disclosed in my application filed February 11, 1907, Serial No. 356,869, where the carriage is provided with a driven feed nut mounted upon the ordinary feed screw disposed in the frame of the machine. In this instance the carriage is provided with the main driving shaft 4 for the saw 5, said shaft being provided with the worm wheel 6 thereon. This carriage is provided at one side with the worm carrier bracket 7 having at opposite sides the contact blocks 8 connected together by the frame 9. Extending longitudinally of the machine and parallel to the ways 2 is the tubular drive shaft 10 which passes through the blocks 8 and is provided with the longitudinal groove or recess 11 therein. Upon this shaft the worm 12 is mounted and secured against rotation by means of the key 13 disposed in the groove 11 and adapted to travel longitudinally therein. This worm is properly spaced between the blocks 8 by means of the washers or other devices as shown at 14 and therefore rotates with the drive shaft and also slides longitudinally thereon. This drive shaft is mounted in any desired bearings, for instance, the bearing 15 at the driving end thereof and the bearing 16 at the opposite end which extends laterally from the base of the work holder 17 mounted upon the ways 2. The driving end of the drive shaft is provided with the tight pulley 18 and the loose pulley 19 mounted thereon in the usual manner, while the driving belt 20 is adapted to be shifted to either of said pulleys.

The belt shipper is slidingly mounted by means of the standard 21 having an arm 22 upon which the loop of the shipper 23 is guided, said shipper being connected to one end of the shifting rod 24 which extends longitudinally through the tubular drive shaft, as shown in Fig. 1. Any desired means may be used for shifting this rod 24, and I have herein illustrated a desirable form comprising the slotted slide plate 25 which is held in position by a screw 26 entering the work holder, this holder being provided with a work clamp 27, as shown. One end of this slide plate is connected with the shifting lever 28 by means of the hinged joint 29, and the lever is pivotally mounted by means of the eyebolt 30 extending therethrough and embracing a pin 31 on the base of the work holder so that the contact of the carriage with one end of the slide plate oscillates the lever to bring its free end into contact with the rod 24 shifting the belt from the tight to the loose pulley and automatically stopping the drive of the carriage.

In the operation of the machine, the parts, as shown in Fig. 1, are in driving position, the worm being rotated with the drive shaft and also traveling thereon longitudinally in the movement of the carriage, while the rotative movement transmitted to the gear of the driving shaft of the carriage actuates the tool carried thereby. The continued movement of the carriage brings it into contact with the automatic stop plate which through the connections before described shifts the belt and brings the machine to rest. It will be observed that this construction permits the carriage and worm on the drive shaft to be slid longitudinally thereon without rotative movement if desired in the rapid return of the carriage, while the driving and feeding motion may be at a predetermined speed. The invention presents a simple, economically constructed and thoroughly efficient mechanism for insuring the drive and feed of the carriage and the automatic stop therefor at any predetermined point.

Having described my invention and set forth its merits, what I claim and desire to secure by Letters Patent is:—

1. In a carriage feed, the combination with a frame provided with a way, a carriage mounted to travel thereon, a driving shaft supported by the frame parallel to said way, driving means for the carriage carried by said shaft, a rod slidably supported upon said shaft and extended beyond the opposite ends thereof, driving devices mounted upon one end of said shaft, a power shipping device mounted upon the extended end of said rod beyond and adjacent to the driving devices, and shifting means disposed at the opposite extended end of said rod and projecting into the path of the carriage to be automatically actuated thereby.

2. In a carriage feed, the combination with a frame provided with a way, a carriage mounted to travel thereon, a driving shaft supported by the frame parallel to said way, driving means for the carriage carried by said shaft, a rod slidably supported upon said shaft and extended beyond the opposite ends thereof, driving devices mounted upon one end of said shaft, a power shipping device mounted upon the extended end of said rod beyond and adjacent to the driving devices, a shifting lever disposed at one end of said driving shaft to engage an extended end of said rod, and means projecting from said lever into the path of travel of said carriage.

3. In a carriage feed, the combination with a frame provided with a way, a carriage mounted to travel thereon, a carriage driving shaft supported by the frame parallel to said way, a rod slidably supported upon said shaft, driving devices connected to said shaft, a power shipping device carried by one end of said rod beyond the driving devices, a shifting lever disconnected from the rod and disposed at one end of said driving shaft to engage an end of said rod, and a slotted plate slidably mounted upon a fixed support in the path of travel of the carriage and pivotally connected to said lever for operating the same.

4. In a sawing machine, the combination with a frame provided with a way, a traveling carriage mounted thereon, a tubular driving shaft having a longitudinal groove upon its periphery and extending parallel to the way, means carried by said driving shaft to actuate the carriage therefrom, driving pulleys carried by one end of said shaft, a slidable rod extending through said shaft and projected beyond the opposite ends thereof, a belt shipper carried by the end of said projected rod beyond and adjacent to said pulleys, and a shifting device mounted upon a fixed support at the opposite projected end of the rod and extending into the path of the carriage to be automatically actuated thereby.

In testimony whereof, I affix my signature in presence of two witnesses.

GOTTLIEB BINDER.

Witnesses:
  Gus Gardner,
  Michael Kemprich.